United States Patent

[11] 3,565,245

| [72] | Inventor | William H. Asher<br>2222 W. 73rd St., Prairie Village, 66208 |
|---|---|---|
| [21] | Appl. No. | 777,693 |
| [22] | Filed | Nov. 21, 1968 |
| [45] | Patented | Feb. 23, 1971 |

[54] COMBINATION FOOD CONTAINER AND UTENSIL
3 Claims, 6 Drawing Figs.

[52] U.S. Cl. .................................................. 206/47, 220/85
[51] Int. Cl. .................................................. B65d
[50] Field of Search ...................................... 206/47, 56(A)3, 72; 99/171(CPD)

[56] References Cited
UNITED STATES PATENTS
2,743,011 4/1956 Woofter .................... 206/56A³UX
3,381,876 5/1968 Biggins ...................... 206/47X
3,136,416 6/1964 Goldrosen .................. 206/56A³
1,607,864 11/1926 Butler ......................... 229/15

FOREIGN PATENTS
334,367 9/1930 Great Britain ............... 206/47

Primary Examiner—Joseph R. Leclair
Assistant Examiner—John M. Caskie
Attorney—Don M. Bradley ABSTRACT: An article constructed of sheet material shaped to present a food-containing portion and including a panel formed to include an eating utensil. The utensil is outlined by slits in the material and tabs of material integral with the utensil and the sheet material releasably hold the utensil to the panel.

PATENTED FEB 23 1971

3,565,245

INVENTOR
William H. Asher

BY Schmidt, Johnson, Hovey,
Williams & Bradley.
ATTORNEYS.

COMBINATION FOOD CONTAINER AND UTENSIL

This invention relates to food handling means, and more particularly, to a food serving container. Systems for dispensing packaged food products in condition to be consumed directly from the container have achieved relatively widespread acceptance. Such systems include automatic cafeterias, vending machines, and business establishments specializing in the service of readily prepared or quickly prepared food items.

Ordinarily these systems contemplate a rapid customer rate and little, if any, attention can be given to waiter and attendant service for providing place settings to the customers. Generally, the customer is called upon to select his own eating utensils such as knives, forks or spoons from a source at or near the food service location. In practice, the source often is an open receptacle such as a can or bucket containing a large group of utensils and from which the customer may select the ones he is to use. Unless each utensil is separately wrapped, the other utensils are highly subject to contamination as a result of this procedure.

Even aside from the sanitation problem, the cost of providing utensils in this manner is quite expensive. Individual packages for each separate utensil is costly, additionally experience has shown that there is a tendency for customers to select an oversupply of utensils when a large number are in the common source. It is almost a habit to select a knife, fork and spoon even though only one of these utensils may be needed for eating the particular food dispensed to the customer. This, of course, results in wastage.

Accordingly, it is the primary object of this invention to provide a food container combined as a unit with a utensil so that the required utensil becomes an integral part of a food package.

It is another important object of this invention to provide a container wherein the utensil is formed as a unit simultaneously with and from the same material as the food-holding portion of the container.

Still a further important object of the invention is to provide a unit wherein the required utensil is readily available to the customer and may be maintained in a sanitary condition until delivered to the customer.

A yet further object of the invention is to provide a unit which may be economically fabricated, using commercially available materials and methods.

Another object of this invention is to provide a readily accessible utensil for a food package, which utensil may be easily removed from the package for use by the customer.

These and other objectives of the present invention will be further explained or will become apparent from the following specification and claims.

Figure 2:
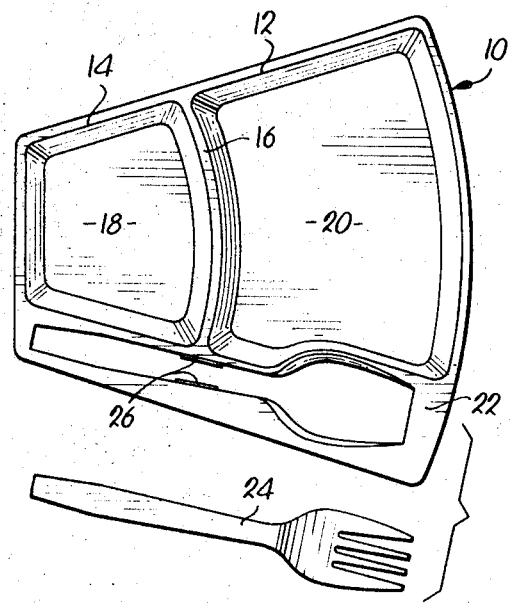
FIG. 2 is an exploded view similar to FIG. 1, but showing the utensil removed from the container.
Figure 1:
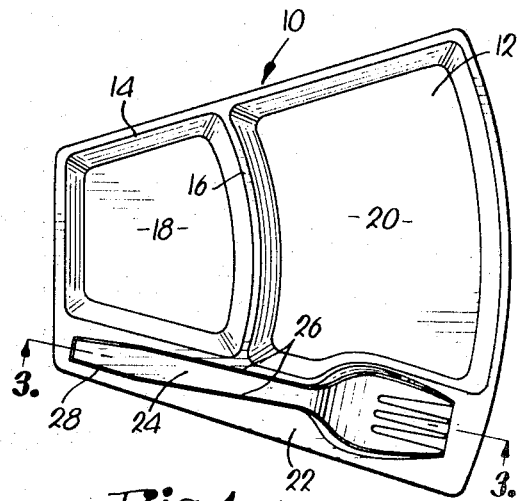
FIG. 1 is a top plan view of a food container embodying the principles of this invention.
Figure 3:
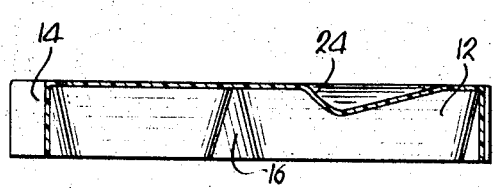
FIG. 3 is a detailed, vertical cross-sectional view taken along line 3-3 of FIG. 1.

A food container embodying the principles of this invention is broadly designated by the numeral 10 in FIGS. 1 and 2. In this embodiment, the container 10 comprises a food-receiving device in the form of a tray 12 including an annular rib 14 and an intermediate rib 16 defining the tray into separated food-receiving compartments 18 and 20 respectively. Manifestly, container 10 may be formed from sheet material and the design of container 10 is such that it is adapted for rapid and economical construction from a material such as plastic or the like by molding or comparable operations.

At one edge of the compartments 18 and 20, a panel 22 of sheet material extends outwardly to present an eating utensil support. The eating utensil 24 is integral with the sheet material of panel 22 by a pair of opposed, relatively short, frangible tabs 26. A slit 28 surrounds the utensil 24 and, with the tabs 26, define the peripheral outline of the utensil 24. Thus, tabs 26 provide bridge means interconnecting the utensil 24 with panel 22.

Manifestly, it is contemplated that container 10 may be utilized in a vending machine or the like for receiving a portion or portions of foods which may be consumed without the necessity of transferring the food to another container. The utensil 24 which is needed for the customer to consume the food in compartments 18 and 20 is conveniently provided to the customer along with the container 10. The customer may merely apply pressure to the projecting ends of utensil 24 to cause the tabs 26 to be broken. The material of the type contemplated for container 10 and utensil 24 is sufficiently frangible that very little pressure is necessary for removing utensil 24 from the panel 22. The customer may then consume the food and panel 22 does not interfere with the handling of the food in any manner. Further, it will be recognized that utensil 24 is maintained in a highly sanitized condition until ultimate delivery of the food to the customer.

If the food to be held by container 10 requires more than one utensil, or a utensil differing from the fork illustrated in FIGS. 1 and 2, then it is merely necessary to utilize a die in production of the container 10 which is suitable for providing the proper utensil or utensils. If necessary, the panel 22 may be slightly larger for foods wherein both a knife and fork, for example, are required.

Figure 4:
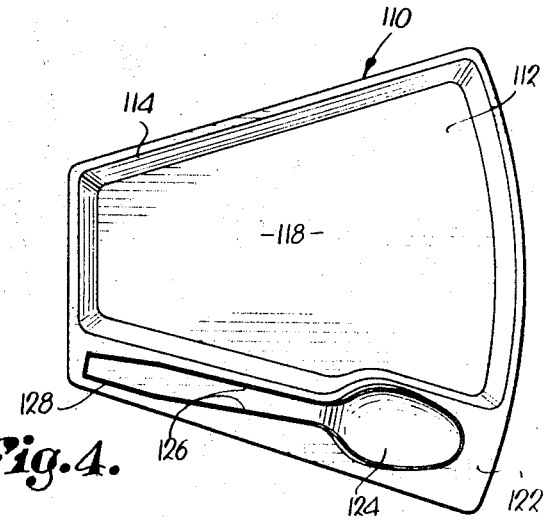
FIG. 4 is a view similar to FIG. 1, but illustrating a modified form of container and utensil.
Figure 5:
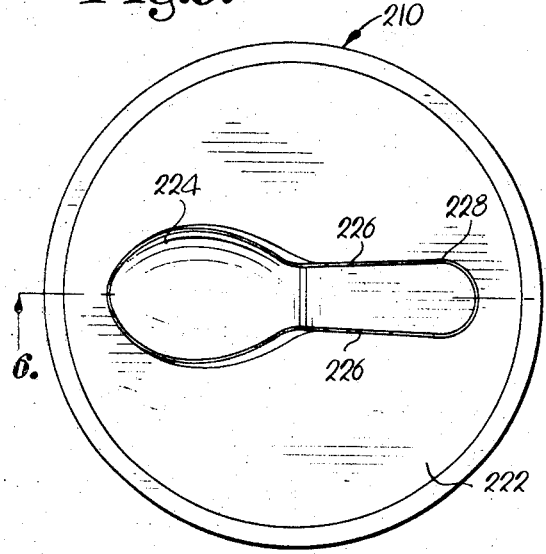
FIG. 5 is a top plan view of another modified unit constructed pursuant to the broad principles of this invention.
Figure 6:
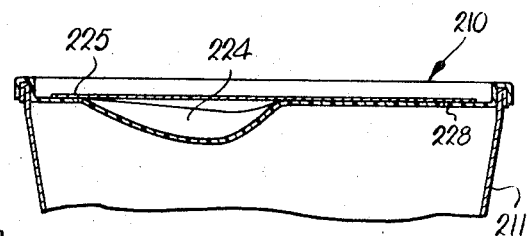
FIG. 6 is a fragmentary, vertical, cross-sectional view taken along line 6-6 of FIG. 5.

Referring to FIG. 4, a container 110 in the nature of a tray 112 is provided with an annular rib 114 which defines a single compartment 118. The integral projecting panel 122 is provided with a utensil 124 in the nature of a spoon defined by the slit 128 and the tabs 126. Obviously, spoon 124 is removed in precisely the same manner as that described with respect to utensil 24.

The use of the work "container" is intended to be quite broad and includes a lid portion 210 of an open top vessel 211 such as a cup or the like. In this modification of the invention, it will be noted that the panel 222 extends in covering relationship to the food-receiving device in the nature of vessel 211 and is removable therefrom. Nevertheless, panel 222 is provided with a slit 228 which, with an integral tab portion 226 defines the outline for a utensil 224. The purchaser of the container 210 is thus provided with a readily usable spoon or utensil 224 for eating the contents of vessel 211 without the necessity for obtaining a utensil from another source. Since panel 222 serves to cover the food in vessel 211, it may be necessary to further cover a utensil 224 to keep the same sanitary. According, this may be accomplished by use of a small label or the like 225 which may be adhesively secured to the upper surface of panel 222 in covering relationship over utensil 224.

It will be readily apparent to those skilled in the art that a wide variety of containers might be provided for accommodating many different foods without departing from the spirit of these invention.

I claim:

1. A tray of unitary, molded plastic construction adapted for dispensing individual food portions to be consumed directly therefrom, said tray comprising:
   a planar member;
   an upwardly extending rib integral with and circumscribing the member to define an open top food receiving compartment for the tray;
   a panel integrally and rigidly joined to the rib adjacent the top thereof and projecting rigidly therefrom;
   an eating utensil formed in the panel in outwardly spaced relationship from the rib;
   bridge means of plastic material integral with the utensil and with the panel interconnecting the utensil and the panel but to permit removal of the utensil upon breaking of the bridge means, the latter being provided with a slit disposed in continuation of the bridge means, the slit and bridge means surrounding the utensil in peripheral outline of the latter, said slit being spaced inwardly of the panel from the outermost peripheral edges of the latter to provide peripheral structural integrity for the panel and reinforcement for the adjacent rib when the utensil is removed from the panel.

2. The invention of claim 1:
said utensil having an elongated handle and food-holding portion;
said handle comprising an area of the utensil which is coplanar with the panel; and
said portion extending in one direction out of the plane of the panel and the handle.

3. The invention of claim 1, said bridge means including a pair of opposed tabs integral with the handle intermediate the ends of the latter.